United States Patent
Santan et al.

(10) Patent No.: US 11,386,034 B2
(45) Date of Patent: Jul. 12, 2022

(54) HIGH THROUGHPUT CIRCUIT ARCHITECTURE FOR HARDWARE ACCELERATION

(71) Applicant: Xilinx, Inc., San Jose, CA (US)

(72) Inventors: Sonal Santan, San Jose, CA (US); Ravi N. Kurlagunda, Fremont, CA (US); Min Ma, San Jose, CA (US); Himanshu Choudhary, Jodhpur (IN); Manjunath Chepuri, Secundrabad (IN); Cheng Zhen, Santa Clara, CA (US); Pranjal Joshi, San Jose, CA (US); Sebastian Turullols, Los Altos, CA (US); Amit Kumar, Hyperabad (IN); Kaustuv Manji, Hyderabad (IN); Ravinder Sharma, Hyderabad (IN); Ch Vamshi Krishna, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/085,740

(22) Filed: Oct. 30, 2020

(65) Prior Publication Data
US 2022/0138140 A1     May 5, 2022

(51) Int. Cl.
*G06F 13/42* (2006.01)
(52) U.S. Cl.
CPC .. *G06F 13/4221* (2013.01); *G06F 2213/0026* (2013.01)
(58) Field of Classification Search
CPC .............. G06F 2213/0026; G06F 13/4221
See application file for complete search history.

(56) References Cited

U.S. PATENT DOCUMENTS

| 4,245,306 A | 1/1981 | Besemer |
| 6,360,243 B1 | 3/2002 | Lindsley |
| 6,477,598 B1 | 11/2002 | Yu |

(Continued)

FOREIGN PATENT DOCUMENTS

WO     2012131523 A1     10/2012

OTHER PUBLICATIONS

Hussain, T et al. PPMC: Hardware scheduling and memory management support for multi accelerators. 22nd Intl. Conf, on FPL, Aug. 2012, pp. 571-57 4 [online], [retrieved on Nov. 27, 2019], Retrieved from the Internet <URL: https://ieeexplore.ieee.org/document/6339373 > <DOI: 10.1109/FPL.2012.6339373 >.

*Primary Examiner* — Nimesh G Patel
(74) *Attorney, Agent, or Firm* — Kevin T. Cuenot (57) ABSTRACT

A hardware acceleration device can include a switch communicatively linked to a host central processing unit (CPU), an adapter coupled to the switch via a control bus, wherein the control bus is configured to convey addresses of descriptors from the host central CPU to the adapter, and a random-access memory (RAM) coupled to the switch through a data bus. The RAM is configured to store descriptors received from the host CPU via the data bus. The hardware acceleration device can include a compute unit coupled to the adapter and configured to perform operations specified by the descriptors. The adapter may be configured to retrieve the descriptors from the RAM via the data bus, provide arguments from the descriptors to the compute unit, and provide control signals to the compute unit to initiate the operations using the arguments.

20 Claims, 7 Drawing Sheets

(56) References Cited

U.S. PATENT DOCUMENTS

| | | |
|---|---|---|
| 6,742,075 B1 * | 5/2004 | Bailey .................... G06F 13/14 710/105 |
| 7,328,277 B2 | 2/2008 | Hussey |
| 7,428,603 B2 | 9/2008 | Henson |
| 7,673,087 B1 | 3/2010 | Schumacher |
| 7,737,725 B1 | 6/2010 | Ansari |
| 7,743,176 B1 | 6/2010 | Turney |
| 7,934,113 B2 | 4/2011 | Chard |
| 8,315,634 B2 | 11/2012 | Gustavsson |
| 9,405,550 B2 * | 8/2016 | Biran ................ G06F 13/4022 |
| 9,547,535 B1 | 1/2017 | Wilt |
| 10,482,054 B1 | 11/2019 | Liu |
| 2004/0028141 A1 | 2/2004 | Hsiun |
| 2007/0283358 A1 | 12/2007 | Kasahara |
| 2009/0217275 A1 | 8/2009 | Krishnamurthy |
| 2010/0146256 A1 | 6/2010 | Luo |
| 2010/0325638 A1 | 12/2010 | Nishimaki |
| 2011/0131430 A1 | 6/2011 | Krishnamurthy |
| 2012/0054771 A1 | 3/2012 | Krishnamurthy |
| 2013/0031553 A1 | 1/2013 | Hou |
| 2013/0117533 A1 | 5/2013 | Hayek |
| 2014/0344815 A1 | 11/2014 | Ginzburg |
| 2015/0135182 A1 | 5/2015 | Liland |
| 2015/0234679 A1 | 8/2015 | Moyer |
| 2015/0293775 A1 | 10/2015 | Persson |
| 2016/0011907 A1 | 1/2016 | Moyer |
| 2016/0026908 A1 | 1/2016 | Van Der Merwe |
| 2016/0055106 A1 | 2/2016 | Ansari |
| 2016/0098365 A1 | 4/2016 | Bshara |
| 2016/0132441 A1 | 5/2016 | Styles |
| 2016/0335215 A1 | 11/2016 | Biran |
| 2018/0300933 A1 * | 10/2018 | Burke .................. G06T 15/005 |
| 2018/0308197 A1 | 10/2018 | Vembu |
| 2019/0026157 A1 | 1/2019 | Suzuki |
| 2019/0158429 A1 * | 5/2019 | Friedman ............... H04L 49/254 |
| 2019/0243571 A1 * | 8/2019 | Narayanan ............ G06F 3/0646 |
| 2019/0347125 A1 | 11/2019 | Sankaran |
| 2021/0208920 A1 * | 7/2021 | Rugina ............... G06F 9/45558 |

\* cited by examiner

Receive a plurality of descriptors and a plurality of addresses for the plurality of descriptors via a switch of a hardware acceleration device, wherein the switch is communicatively linked to a host processor
502

Convey the plurality of descriptors to a random-access memory for storage therein via a high-speed data bus
504

Convey the plurality of addresses to an adapter circuit via a control bus
506

Use the adapter, retrieve the descriptors from the random-access memory, provide arguments from the descriptors to a compute unit, and provide control signals to the compute unit to initiate the operation using the arguments
508

HIGH THROUGHPUT CIRCUIT ARCHITECTURE FOR HARDWARE ACCELERATION

TECHNICAL FIELD

This disclosure relates to integrated circuits (ICs) and hardware acceleration. More particularly, this disclosure relates to achieving high data throughput for hardware accelerators.

BACKGROUND

Hardware acceleration refers to using specialized hardware, referred to as a hardware acceleration device, to perform a function more efficiently than had the function been performed by a general-purpose central processing unit (CPU) of a computer system such as a server. A hardware acceleration device typically provides one or more benefits that are not attainable through execution of the function by the CPU. The benefit(s) may include, but are not limited to, one or more of faster operation, reduced power consumption, and redundancy. Though the benefits of using a hardware acceleration device may or may not include faster operation, the process of offloading a function from a CPU to specialized hardware is referred to as "hardware acceleration."

Modern computer systems and peripheral devices are capable of handling ever increasing data throughputs. For example, certain Peripheral Component Interconnect Express (PCIe) devices such as Non-Volatile Memory Express (NVMe) storage devices and/or Ethernet, e.g., networking, devices are able to operate at data rates on the order of millions of operations per second. To remain viable, so too must hardware acceleration devices which often operate as peripheral devices to CPUs and/or host computers.

SUMMARY

In one aspect, a hardware acceleration device can include a switch communicatively linked to a host central processing unit (CPU), an adapter coupled to the switch via a control bus, wherein the control bus is configured to convey addresses of descriptors from the host CPU to the adapter, and a random-access memory (RAM) coupled to the switch through a data bus. The RAM is configured to store descriptors received from the host CPU via the data bus. The hardware acceleration device can include a compute unit coupled to the adapter and configured to perform operations specified by the descriptors. The adapter may be configured to retrieve the descriptors from the RAM via the data bus, provide arguments from the descriptors to the compute unit, and provide control signals to the compute unit to initiate the operations using the arguments.

In another aspect, a method of hardware acceleration can include receiving a plurality of descriptors and a plurality of addresses for the plurality of descriptors via a switch of a hardware acceleration device, wherein the switch is communicatively linked to a host CPU. The descriptors specify operations to be performed by a compute unit of the hardware acceleration device. The method can include conveying the plurality of descriptors to a RAM for storage therein via a data bus and conveying the plurality of addresses to an adapter circuit via a control bus. The method can include, using the adapter, retrieving the descriptors from the RAM via the data bus, providing arguments from the descriptors to the compute unit, and providing control signals to the compute unit to initiate the operations using the arguments.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and hardware acceleration. More particularly, this disclosure relates to achieving high data throughput for hardware accelerators. Typically, hardware accelerators process data at rates on the order of tens of thousands of operations per second (OPS) to approximately a hundred thousand OPS. To achieve data rates in this range, input batching is often used. Data rates in this range are unable to keep pace with more modern peripheral devices that are capable of operating with data rates on the order of a million OPS.

In accordance with the inventive arrangements described within this disclosure, a circuit architecture is provided that is capable of providing high-speed data throughput for hardware accelerators. The circuit architecture is capable of providing data throughputs that match the line rate of high-speed input/output (I/O) interfaces such as Non-Volatile Memory Express (NVMe) often found on storage devices. For example, using the example circuit architectures described herein, data throughput rates of approximately one million OPS may be achieved. It should be appreciated that the inventive arrangements described within this disclosure may be used in any of a variety of hardware acceleration devices and/or applications beyond those relating to data storage.

In an example implementation, the circuit architecture described herein may be used with hardware accelerators and the accelerator engines, e.g., compute units, contained therein. The hardware accelerator, having one or more accelerator engines implemented therein, may be communicatively linked to a host central processing unit (CPU) by way of a communication bus such as a Peripheral Component Interconnect Express (PCIe) bus. The host CPU is capable of executing operational software so that host applications executed by the host CPU are able to provide fine-grained control over the operation of the accelerator engine(s) contained in the hardware accelerator. Further, the circuit architecture provides a hardware interface to the accelerator engine(s) that allows the host CPU, in executing the operational software, to keep the accelerator engine(s) busy, thereby achieving sustained data throughput while also reducing the transactional overhead between the host CPU and the accelerator engine(s).

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
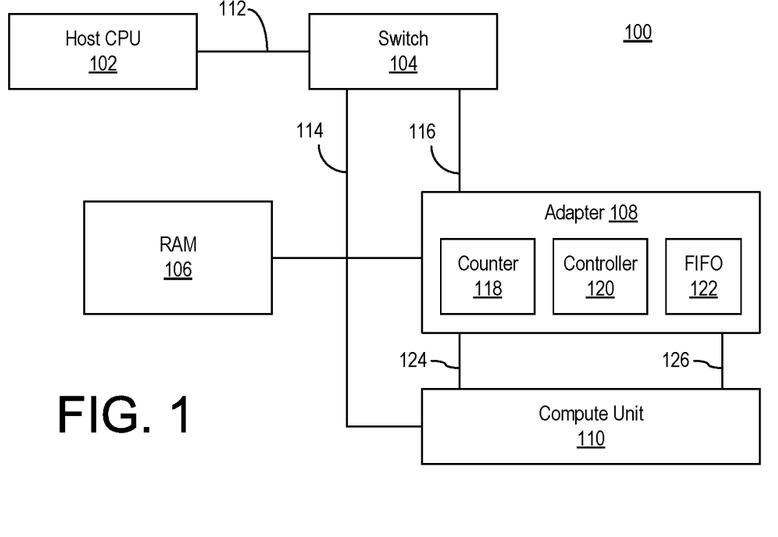
FIG. 1 illustrates an example circuit architecture for hardware acceleration.

FIG. 1 illustrates an example circuit architecture 100 for hardware acceleration. Circuit architecture 100 is capable of increasing the data throughput that may be handled by compute unit 110. In one aspect, circuit architecture 100 increases data throughput by, at least in part, reducing the transactional overhead for a host CPU to offload operations to a compute unit for purposes of hardware acceleration.

Figure 6:
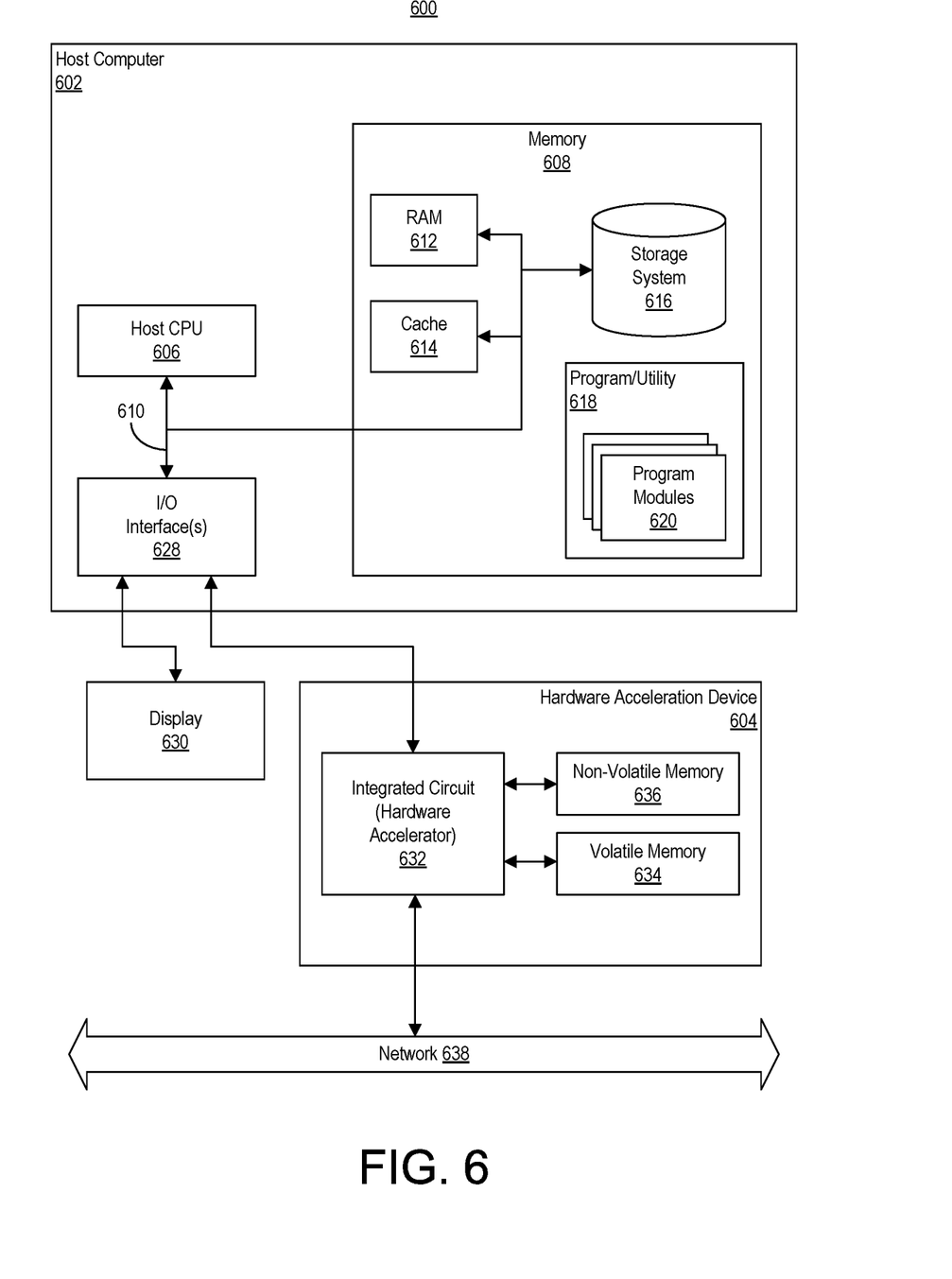
FIG. 6 illustrates an example computing environment for hardware acceleration.

In the example of FIG. 1, circuit architecture 100 includes a host CPU 102, a switch 104, a random-access memory (RAM) 106, an adapter 108, and a compute unit 110. Host CPU 102 is coupled to switch 104 by a communication channel 112. In an example implementation, host CPU 102 is included in a host computer (not shown) while switch 104, adapter 108, compute unit 110, and optionally RAM 106 are located in a hardware accelerator. An example host computer 602 is shown in FIG. 6. The hardware accelerator may be implemented as an IC. In that case, communication channel 112 is implemented as a communication bus. An example of a communication bus is a Peripheral Component Interconnect Express (PCIe) bus. In such an implementation, switch 104 may be implemented as a PCIe endpoint.

Figure 7:
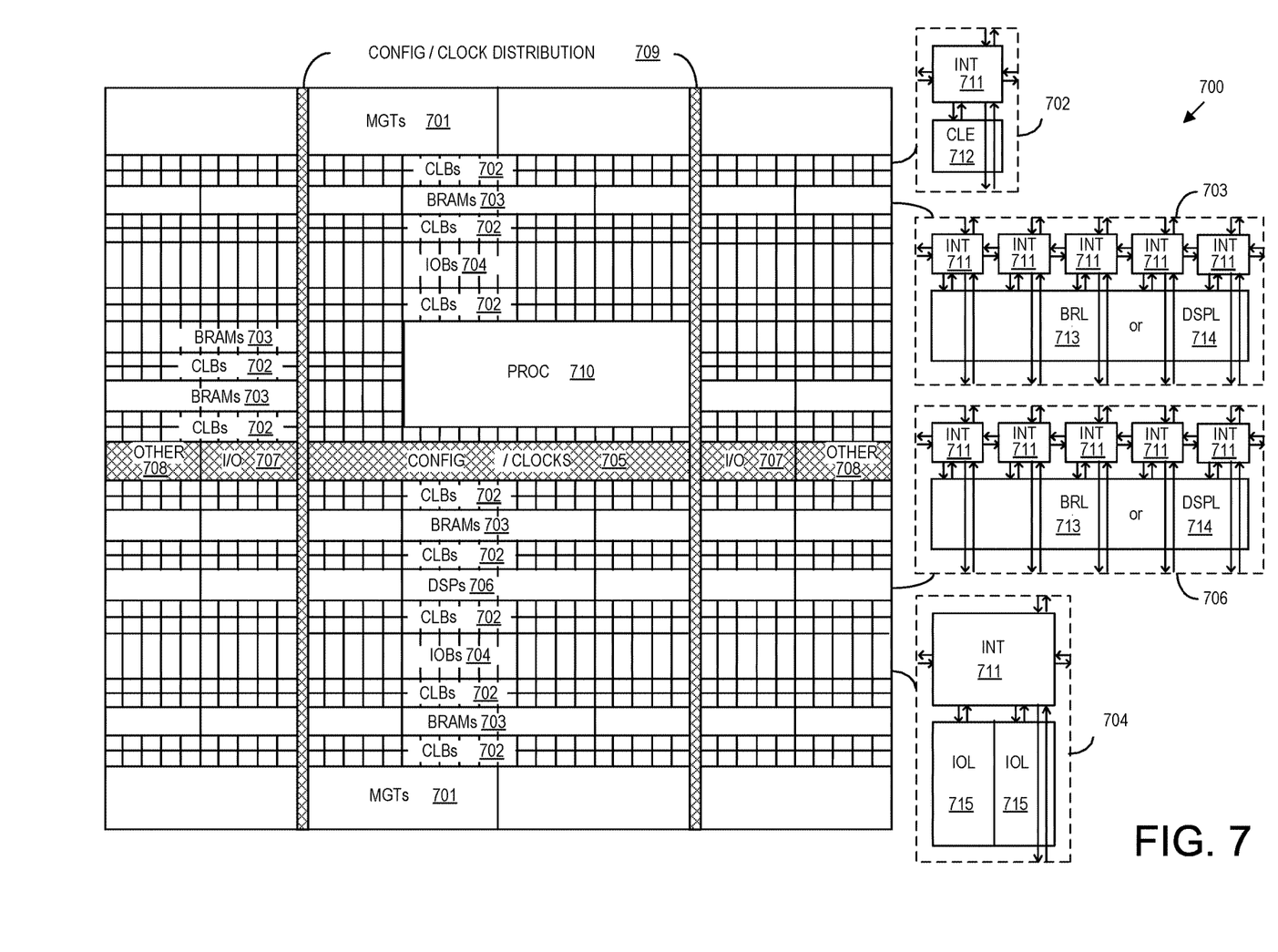
FIG. 7 illustrates an example architecture for an integrated circuit (IC) that may be used for hardware acceleration.
Figure 8:
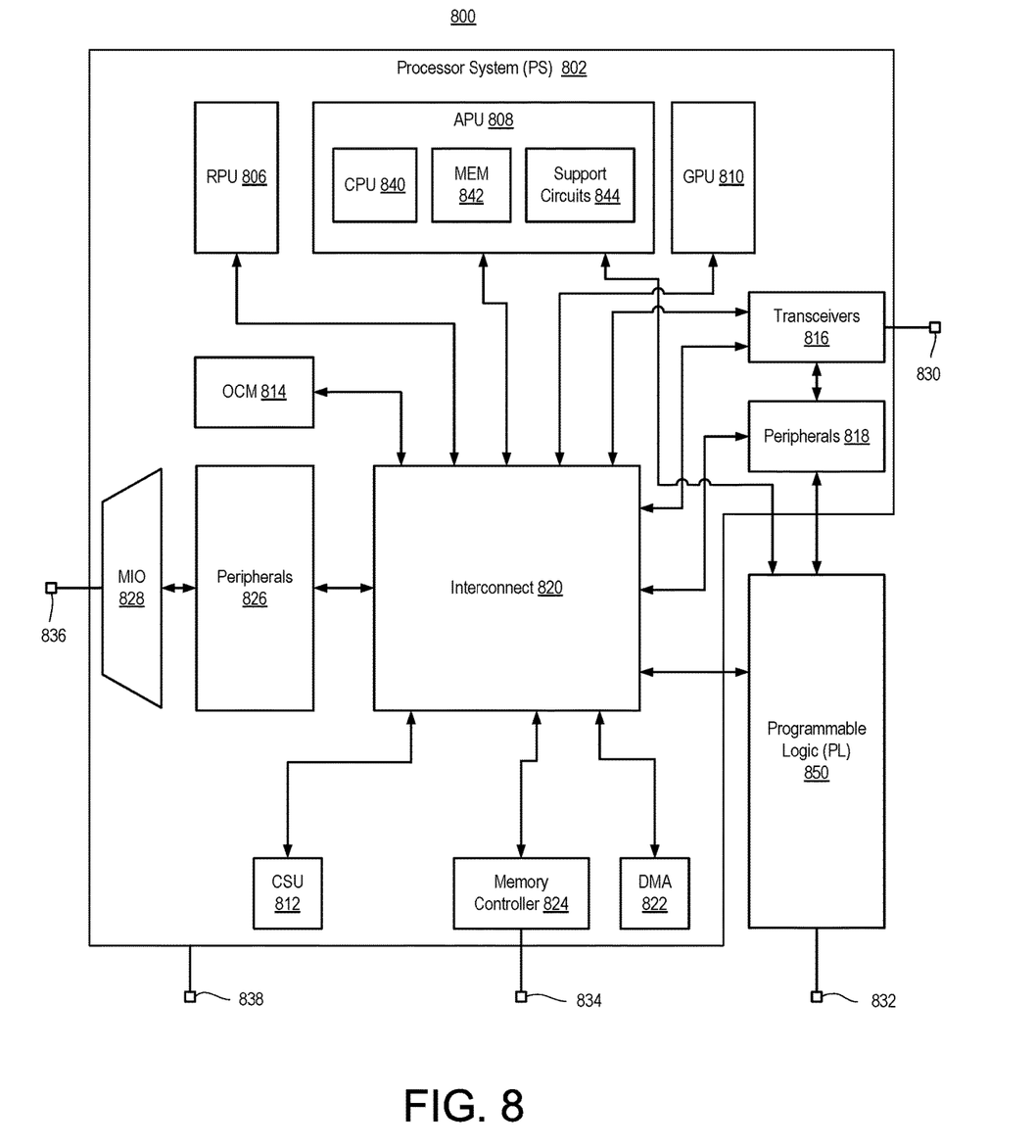
FIG. 8 illustrates another example architecture for an IC that may be used for hardware acceleration.

In another example implementation, host CPU 102 is embedded in the hardware accelerator. For example, host CPU 102 is embedded in the same IC as switch 104, adapter 108, compute unit 110, and optionally RAM 106. In that case, host CPU 102 may be connected to switch 104 via one or more on-chip wires or interconnects. In such an implementation, switch 104 may be implemented as an on-chip interconnect. For example, switch 104 may be implemented as a cross-bar switch. Example IC architectures including processors/CPUs are illustrated in FIGS. 7 and 8. Host CPU 102 may operate as described below whether implemented in a host computer or embedded in the IC with the other components described.

Switch 104 is coupled to RAM 106, adapter 108, and optionally compute unit 110 via a data bus 114. In one example implementation, data bus 114 may be implemented as a high-speed data bus. Data bus 114 may be implemented as a memory-mapped bus. An example of a memory-mapped bus is an Advanced Microcontroller Bus Architecture (AMBA) eXtensible Interface (AXI) bus. A memory-mapped AXI bus allows switch 104 to establish on-chip connections and communicate with one or more slave circuit blocks coupled to the bus. Within this disclosure, AXI is provided as an example of a bus and is not intended as a limitation. Other types of buses may be used in place of an AXI bus.

Switch 104 is also coupled to adapter 108 through a control bus 116. Control bus 116 may be a slower bus than data bus 114. Further, control bus 116 may be implemented as a point-to-point interface whereas data bus 114 is not. In an example implementation, control bus 116 may be implemented as an AXI-Lite (e.g., an AXI4-Lite) compliant bus. In the example implementations described herein, data bus 114 is capable of operating at a higher clock rate and providing higher data throughput or bandwidth than control bus 116. Within this disclosure, data bus 114 and control bus 116 may be considered examples of on-chip interconnects.

Adapter 108 may include a counter 118, a controller 120, and a first-in-first-out (FIFO) memory 122. In an example implementation, controller 120 may be implemented as a state machine circuit that is capable of coordinating operation of counter 118 and FIFO memory 122. Adapter 108 is coupled to compute unit 110 to provide arguments via communication channel 124 and control signals via control channel 126.

In one aspect, RAM 106 may be implemented as one or more block RAMs (BRAMs) or other RAM circuit blocks that are included within programmable circuitry or programmable logic of the same IC including switch 104, adapter 108, and compute unit 110. For example, in the case where the hardware accelerator is a programmable IC such as a field programmable gate array (FGPA) or other IC including some programmable circuitry and/or logic, RAM 106 may be implemented using the programmable circuitry and/or logic of the IC.

In another aspect, RAM 106 may be implemented as off-chip memory. For example, RAM 106 may be implemented as Double Data Rate (DDR) RAM that is disposed on the same circuit board or card as the hardware accelerator. In that case, the hardware accelerator may include a memory controller (not shown) that is coupled to switch 104 and adapter 108 via data bus 114. The memory controller may be coupled to the off-chip memory to effectuate read and write operations thereto.

In another aspect, RAM 106 may be implemented as a high bandwidth memory (HBM). In an example, the hardware accelerator may be a multi-die IC where the HBM is implemented on a different die of the hardware accelerator than is switch 104, adapter 108, and controller 120. The HBM still may be implemented in the same package. In another example, the HBM may be an off-chip memory that is disposed on the same circuit board or card as the IC.

In the example of FIG. 1, where host CPU 102 is implemented in a host computer system that is separate and distinct from the hardware accelerator, RAM 106 is considered local to the hardware accelerator. That is, RAM 106 is distinct from any RAM or memory that may be contained in the host computer system that may include host CPU 102.

Using architecture 100, host CPU 102 is capable of offloading operations to compute unit 110 to achieve greater data throughput than had architecture 100 not been used. For example, host CPU 102 is capable of combining the arguments that are to be provided to compute unit 110 into a descriptor. The arguments in the descriptor are the data upon which compute unit 110 is to operate to perform the offloaded operation(s). In accordance with the inventive arrangements described herein, the descriptor provided by host CPU 102 is stored in RAM 106. The descriptor is provided to RAM 106 using data bus 114.

Because the descriptor is provided to a memory, host CPU 102 is capable of transferring the descriptor using memory write transactions as opposed to register write operations. For example, in conventional hardware acceleration architectures where the CPU provides arguments to the compute unit, the CPU does so by writing the arguments (e.g., data) to the register-based interface of the compute unit. The CPU writes to the register interface of the compute unit by executing native register write instructions of the CPU. In general, each register write instruction conveys a small or limited amount of data, e.g., approximately 4 bytes of data. Examples of register write operations include, but are not limited to, "readb( )", "readl( )", "readq( )" or other equivalent write operations used for memory mapped register access. Operations such as the examples listed convey data in quantities of 1 byte, 4 bytes, or 8 bytes, for example. Thus, transferring large arguments to the compute unit requires greater transactional overhead in that more register write instructions must be executed which requires more time.

By comparison, the native instructions of host CPU 102 that support memory writes are often capable of implementing burst data transfers. In contrast with register write operations used to access control registers of devices, the "memcpy( )" operation is an example of a memory write operation capable of transferring a larger amount of data. As an illustrative and non-limiting example, whereas one register write instruction executed by host CPU 102 may convey 4 bytes of data, a memory write instruction initiated by host CPU 102 may be capable of bursting 32 bytes of data. By transferring descriptors from host CPU 102 to RAM 106 using memory transfers as described, instead of writing to the registers of compute unit 110, the transactional overhead and time needed to send data to the hardware acceleration device and compute unit 110 may be reduced, thereby increasing data throughput.

Host CPU 102 is capable of writing the descriptor directly to RAM 106 via data bus 114. In addition, host CPU 102 is capable of providing the address to which the descriptor was written in RAM 106 to adapter 108. In providing the address, host CPU 102 performs a register write of the address value. The address of the descriptor as provided by host CPU 102 is provided to adapter 108 via control bus 116. The address may be stored in FIFO 122 under control of controller 120.

In some cases, host CPU 102 may have implemented therein heuristics in which register write operations are queued internally until a register read operation is performed. The example architecture of FIG. 1 overcomes such heuristics by utilizing memory write operations to transfer arguments instead of register write operations. This prevents host CPU 102 from queuing or otherwise delaying the providing of data to the hardware accelerator since the memory writes may be performed without being affected by any register read/write heuristic.

FIFO 122 is capable of storing a list of addresses of descriptors stored in RAM 106. Adapter 108 is capable of controlling operation of compute unit 110 to continually provide compute unit 110 with arguments so that compute unit 110 may continue to perform operations without delay. For example, controller 120 may extract an address from FIFO 122 and retrieve the descriptor stored at the address from RAM 106. Controller 120 may provide the arguments from the retrieved descriptor to compute unit 110 via communication channel 124. Once the arguments have been provided to compute unit 110, controller 120 is capable of starting of compute unit 110 via control bus 126 to begin operating on the arguments.

In one aspect, adapter 108 serves as a high-speed interface to compute unit 110. Host CPU 102 need not spend time writing to registers of compute unit 110 to provide arguments thereto. Instead, host CPU 102 is capable of continually providing descriptors to RAM 106 using data bus 114 by executing more efficient memory write instructions. The number of register write operations performed by host CPU 102 is reduced in that host CPU 102 need only write the address of each descriptor stored in RAM 106 to adapter 108. Adapter 108 is capable of retrieving the descriptor using the address over data bus 114. Adapter 108 then performs the register write operations to provide compute unit 110 with the arguments necessary to perform the operation offloaded from host CPU 102.

In the example of FIG. 1, host CPU 102 need not know the particular register interface of compute unit 110. Host CPU 102 may write the descriptor including the arguments to memory. Adapter 108 is configured to parse the descriptor to extract the arguments included therein and provide the arguments to the appropriate registers of the register interface of compute unit 110. This means that host CPU 102 may continue to write descriptors to RAM 106 to queue up further offloaded operations for compute unit 110 to perform while adapter 108 manages operation of compute unit 110. This allows compute unit 110 to continue processing a next set of arguments after completing an operation rather than waiting for host CPU 102 to send further arguments. Compute unit 110 may continue to operate on arguments as descriptors await processing in RAM 106 based on the addresses taken from FIFO 122.

Counter 118 is capable of tracking the number of jobs, e.g., descriptors, sent from host CPU 102 to the hardware accelerator and that have been completed. A completed job or descriptor is one in which compute unit 110 has finished processing. In one aspect, controller 120 is capable of polling a particular register of compute unit 110 to determine when compute unit 110 completes execution of a descriptor. In another aspect, compute unit 110 is capable of generating an interrupt to adapter 108, e.g., to controller 120, indicating that compute unit 110 has completed execution of a descriptor. In any case, controller 120, in response to determining that compute unit 110 completed execution of a descriptor, increments counter 118. Further, controller 120 may then transfer another descriptor to compute unit 110 via communication channel 124 and start compute unit 110 via control channel 126.

Host CPU 102 is capable of maintaining an internal count of jobs that have been offloaded to the hardware accelerator. Host CPU 102 further is capable of tracking the order in which jobs have been sent to the hardware accelerator. In one aspect, host CPU 102 is capable of reading the contents of counter 118 via control bus 116. By comparing the internal count maintained by host CPU 102 with the count read from counter 118, host CPU 102 is capable of determining the number of outstanding jobs for the hardware accelerator. That is, host CPU 102 is capable of determining a difference between the internal count and the count read from counter 118. The difference indicates the number of jobs offloaded to the hardware accelerator that have not yet been completed. Further, because descriptors are processed by the hardware accelerator in FIFO order based on the storage of addresses in FIFO 122 and host CPU 102 tracks the order in which jobs are offloaded to the hardware accelerator, host CPU 102 is capable of determining which of the jobs offloaded to the hardware accelerator have completed and which have not. Thus, at any given time, host CPU 102 is capable of determining how many of the jobs (e.g., descriptors and corresponding addresses) offloaded to the hardware accelerator remain to be processed (e.g., have not completed), how many have been processed, and the particular jobs remaining to be processed.

FIFO 122 may include one or more registers that indicate the amount of data stored therein and/or the amount of space available therein. For example, FIFO 122 may include a vacancy register that counts FIFO vacancy. The vacancy register may be adjusted (e.g., increment and/or decremented) as data is read from FIFO 122 and/or written to FIFO 122 to indicate the amount of available space in FIFO 122. In one aspect, such register(s) may be read by controller 120 and/or host CPU 102 to determine the amount of space available in FIFO 122.

Figure 2:
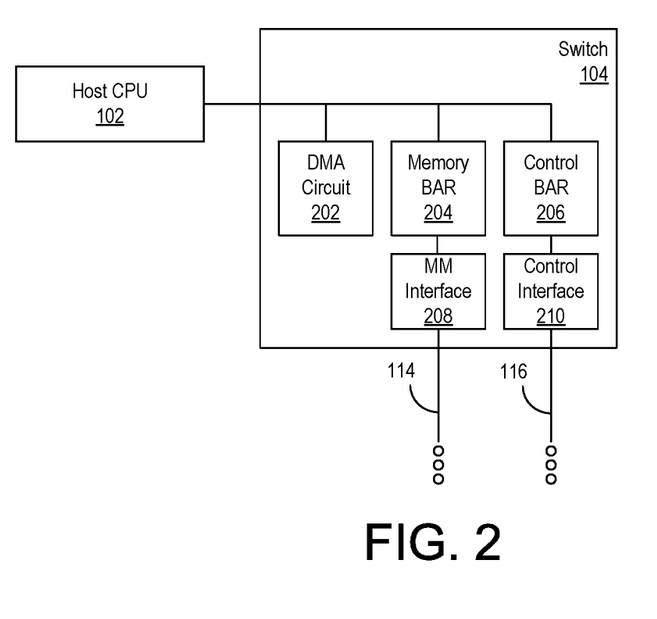
FIG. 2 illustrates an example implementation of a switch from the architecture of FIG. 1.

FIG. 2 illustrates an example implementation of switch 104 of FIG. 1. In the example of FIG. 2, switch 104 is implemented as a PCIe endpoint that is capable of communicating with host CPU 102 over a PCIe communication link. Switch 104 may include a DMA circuit 202 that may be bypassed. Switch 104 further includes a memory Base Address Register (BAR) 204 and a control BAR 206. Memory BAR 204 is coupled to a memory mapped interface 208 and data bus 114. Control BAR 206 is coupled to a control interface 210 for communicating over control bus 116. Using two different BARs, one for data bus 114 and the other for control bus 116, allows host CPU 102 to send data such as the descriptors over data bus 114 separately from the addresses of the descriptors that are provided to FIFO 122 in adapter 108 over control bus 116. For example, the memory write instructions direct data to memory BAR 204 while the register write operations direct data to control BAR 206.

In example implementations where host CPU 102 is embedded in the hardware accelerator, switch 104 may be implemented as an on-chip interconnect. As an illustrative and non-limiting example, switch 104 may be implemented as an AXI bus. In that case, rather than using BARs as illustrated in FIG. 2, the BARs of switch 104 may be replaced with apertures (e.g., subsets of a slave/endpoint's entire addressing range) using general purpose ports that connect to data bus 114 and control bus 116, respectively. In this example, the slave may be adapter 108 and/or RAM 106.

Figure 3:
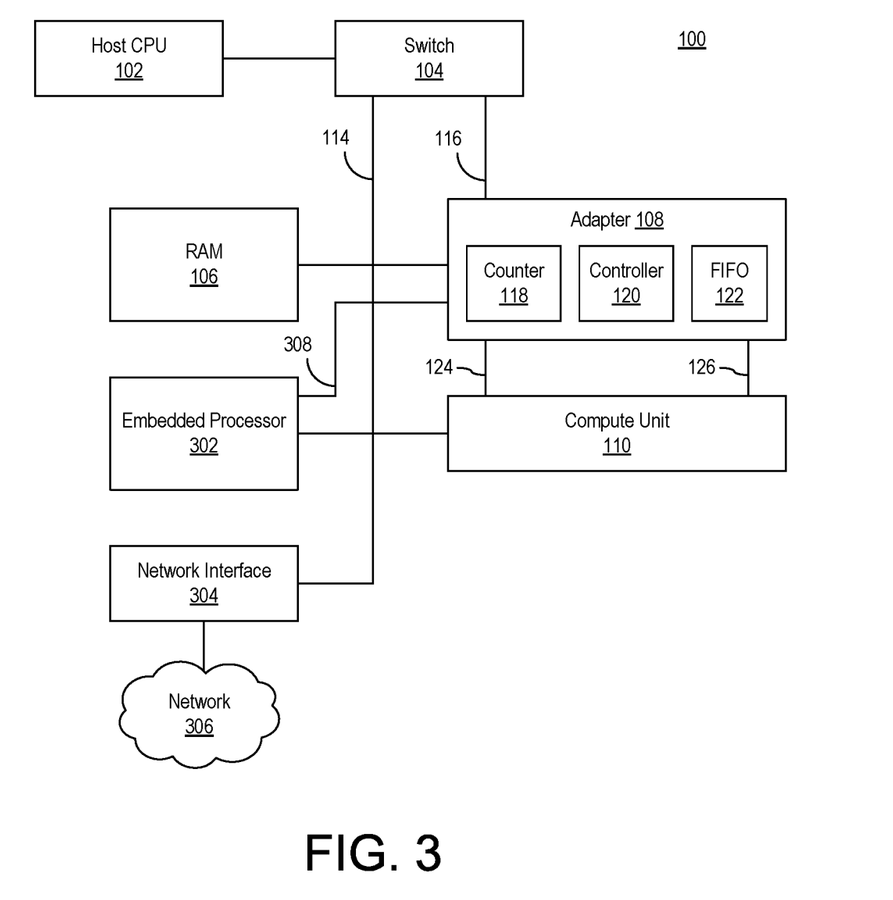
FIG. 3 illustrates another example circuit architecture for hardware acceleration.

FIG. 3 illustrates another example of architecture 100 for hardware acceleration. In the example of FIG. 3, an embedded processor 302 and a network interface 304 are included in the hardware accelerator. RAM 106 may be implemented as any of the different types of memories described in connection with FIG. 1.

In one aspect, embedded processor 302 may be implemented as a hardwired processor. In another aspect, processor 302 may be implemented as a soft-processor. A soft-processor is a processor that is implemented using programmable circuitry or programmable logic of an IC. In either case, embedded processor 302 is located in the same hardware accelerator, or IC, as switch 104, adapter 108, compute unit 110, optionally RAM 106 depending on the type of memory used, and optionally host CPU 102 depending on the type of IC used to implement architecture 100.

Network interface 304 may be an input/output (I/O) interface such as a network interface that is capable of communicating with other off-chip devices and/or nodes over a network 306 such as an Ethernet network. In the example of FIG. 1, architecture 100 may be a Network-Interface-Controller (NIC) implementation.

In the example of FIG. 3, data, e.g., descriptors, may be received via network interface 304 from nodes and/or devices on network 306. In that case, operations to be performed by compute unit 110 may originate from network 306 and/or from host CPU 102. Embedded processor 302 is capable of receiving descriptors received over network 306 from network interface 304 and writing the descriptors to RAM 106 via data bus 114. Further, embedded processor 302 is capable of writing the addresses of the descriptors as stored in RAM 106 to FIFO 122 via a control bus 308. Control bus 308 may be implemented as a point-to-point communication link between embedded processor 302 and adapter 108 that is separate and independent of control bus 116. For example, control bus 308 may also be implemented as an AXI-Lite compliant bus. Adapter 108 and compute unit 110 may operate as described so that compute unit 110 is capable of performing hardware accelerated operations originating from host CPU 102 and/or network 306. Compute unit 110 may perform operations originating from both sources in the order in which addresses of descriptors are stored in FIFO 122.

Figure 4:
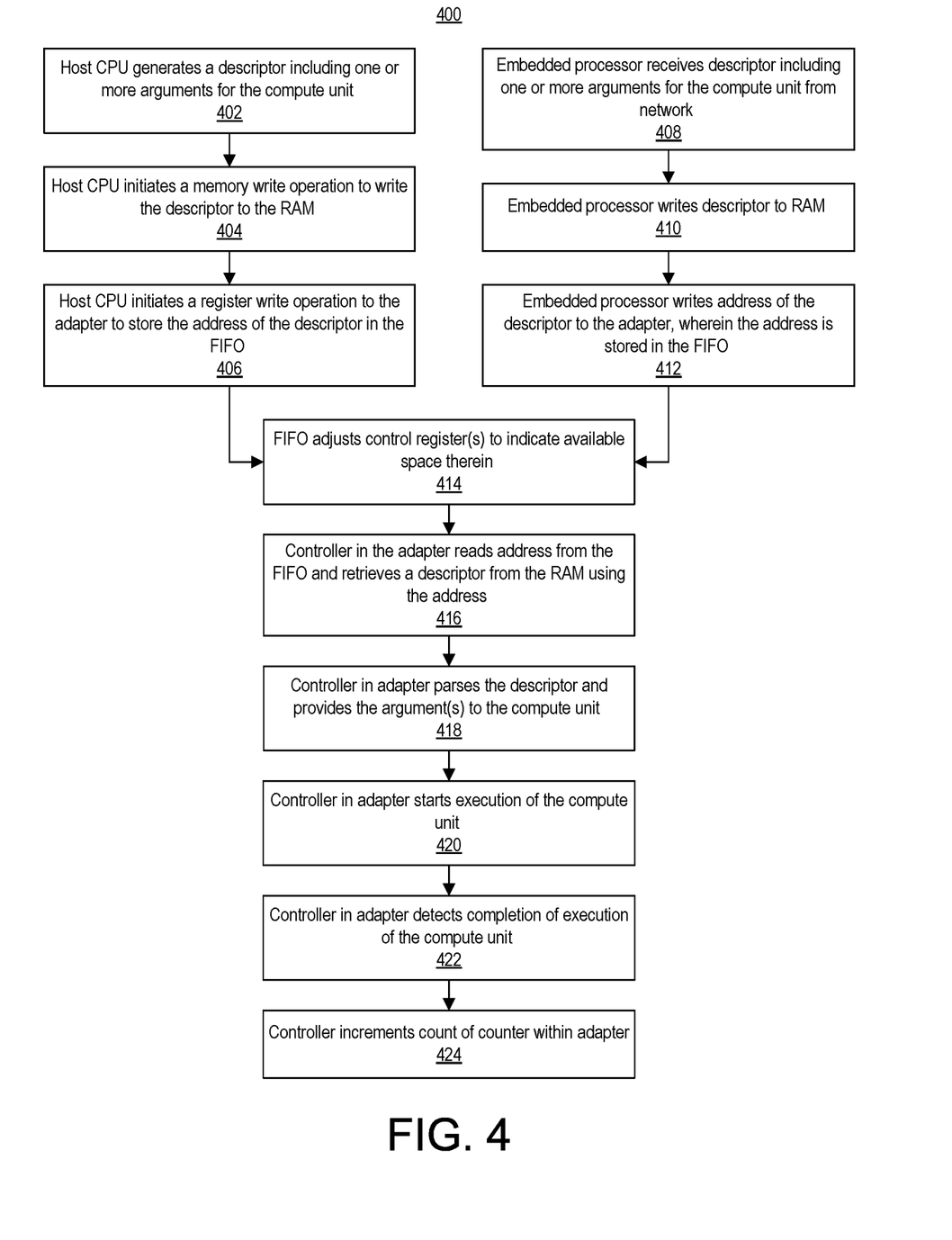
FIG. 4 illustrates an example method of hardware acceleration using the example architecture of FIG. 1 or 3.

FIG. 4 illustrates an example method 400 of hardware acceleration using the example architecture of FIG. 1 or 3. In block 402, the host CPU generates a descriptor including one or more arguments for the compute unit. The host CPU may be included in a host computer that is separate from the hardware accelerator that includes the compute unit. For example, the hardware accelerator may be disposed on a hardware acceleration card or board that is a peripheral device of the host computer where the host CPU and the hardware accelerator communicate via a PCIe communication link. In another example, the host CPU is a processor that is embedded in the same hardware accelerator as the compute unit.

In block 404, the host CPU initiates a memory write operation to write the descriptor to the RAM that is local to the hardware accelerator. For example, the host CPU executes one or more native memory write instructions, where each such memory write instruction may perform a burst data transfer. The descriptor is written to a specified address in the RAM that is local to the hardware accelerator. In an example where the host CPU is disposed in a host computer, the host CPU directs the memory write operation to the memory BAR of the hardware accelerator. Whether the host CPU is disposed in the host computer or embedded in the hardware accelerator, the host CPU directs the descriptor to the data bus such that the descriptor is conveyed to the RAM over the data bus and written to the RAM.

In block 406, the host CPU initiates a register write operation to the adapter to store the address of the descriptor in the FIFO therein. For example, the host CPU executes one or more native register write instructions. In the example where the host CPU is disposed in a host computer, the host CPU directs the register write operation to the control BAR of the hardware accelerator. Whether the host CPU is disposed in the host computer or embedded in the hardware accelerator, the host CPU directs the address to the control bus such that the address is conveyed to the adapter via the control bus and written to the FIFO.

Blocks 408-412 illustrate example operations that may be performed in implementations where the hardware accelerator includes a network interface and an embedded processor. In implementations where the hardware accelerator includes a network interface and embedded processor as described in connection with FIG. 3, the operations described in blocks 408-412 may be performed in lieu of blocks 402-406, in alternating fashion with blocks 402-406, or concurrently with blocks 402-406.

In block 408, the embedded processor receives a descriptor including one or more arguments therein for the compute unit from the network via the network interface. In block 410, the embedded processor initiates a memory write operation to write the descriptor to the RAM. For example, the embedded processor executes one or more native memory write instructions, where each such memory write instruction may perform a burst data transfer. The embedded processor is capable of writing the descriptor to the RAM over the data bus. The descriptor is written to a specified address in the RAM that is local to the hardware accelerator. In block 412, the embedded processor initiates a register write operation to the adapter to store the address of the descriptor in the FIFO therein. For example, the embedded processor executes one or more native register write instructions to write the address of the descriptor to the FIFO of the adapter. In one aspect, the embedded processor is capable of writing the address via the bus connection illustrated in FIG. 3. In another aspect, the embedded processor may have a separate control interface (e.g., a further point-to-point connection) established with the adapter over which the embedded processor conveys the address of the descriptor.

In block 414, the FIFO is capable of adjusting the control register(s) to indicate the amount of available space therein. In block 416, the controller in the adapter reads an address from the FIFO and retrieves a descriptor from the RAM using the address. In block 418, the controller parses the descriptor to extract the arguments contained therein. The controller provides the argument(s) from the descriptor to the compute unit. For example, the controller writes the arguments to the register interface of the compute unit via communication channel 124.

In block 420, the controller starts execution of the compute unit. For example, the controller provides a start signal to the compute unit via control channel 126. In block 422, the controller detects completion of execution of the compute unit. As noted, the controller may poll a register of the compute unit to detect when the compute unit completes operation or the compute unit may generate an interrupt to the controller indicating that the compute unit has completed operation. In block 424, the controller increments the count stored in the counter within the adapter in response to determining that the compute unit completed operation.

The operations described in FIG. 4 are provided for purposes of illustration and not limitation. It should be appreciated that the method described may continue to iterate to process further descriptors. Portions of method 400 may also operate concurrently and in parallel with others. For example, blocks 402-406 may execute concurrently with blocks 408-412 and with blocks 414-424.

Figure 5:
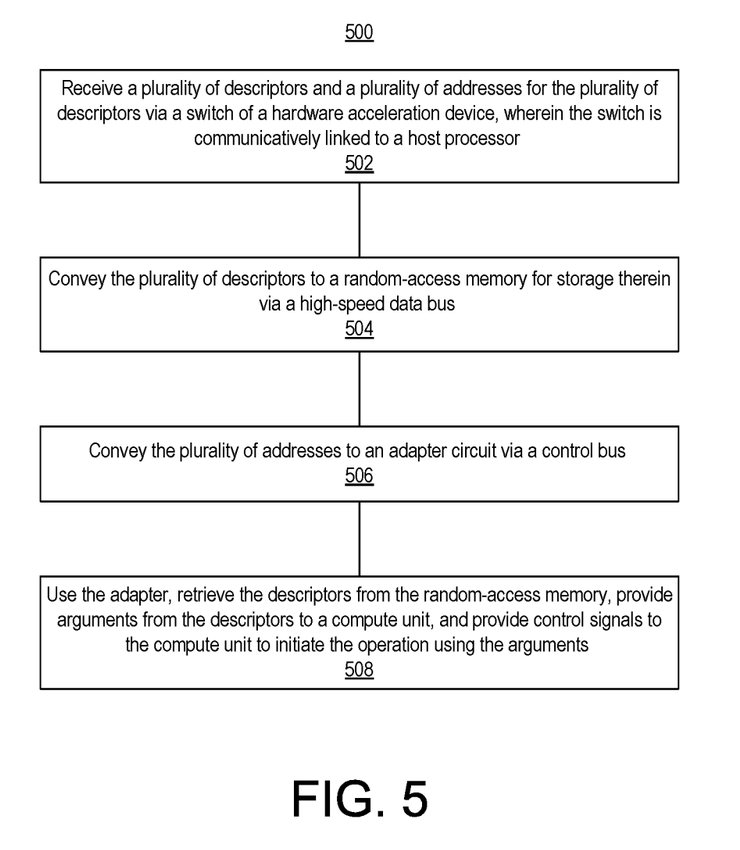
FIG. 5 illustrates another example method of hardware acceleration using the example architecture of FIG. 1 or 3.

FIG. 5 illustrates another example method 500 of hardware acceleration using the example architecture of FIG. 1 or 3.

In block 502, a switch within a hardware accelerator, e.g., an IC, disposed on a hardware acceleration device receives a plurality of descriptors and a plurality of addresses for the plurality of descriptors. The switch is communicatively linked to the host CPU, which sends the plurality of descriptors and the plurality of addresses. The descriptors specify operations to be performed by the compute unit within the IC.

In block 504, the plurality of descriptors are conveyed from the switch to a RAM for storage therein via a data bus. In block 506, the plurality of addresses are conveyed to an adapter circuit via a control bus. For example, the adapter circuit may include a FIFO configured to store the addresses. The data bus is configured to operate at a higher frequency or data rate than the control bus.

In block 508, the adapter is capable of retrieving the descriptors from the RAM via the data bus, providing arguments from the descriptors to the compute unit, and providing control signals to the compute unit to initiate operation using the arguments.

The foregoing and other implementations can each optionally include one or more of the following features, alone or in combination. Some example implementations include all the following features in combination.

In one aspect, the switch is a PCIe switch. The PCIe switch may include a first BAR, e.g., a control BAR, coupled to the control bus and a second bar, e.g., a memory BAR, coupled to the data bus.

In another aspect, the hardware accelerator of the hardware acceleration device is a programmable IC that includes the switch, the adapter, and the compute unit. The hardware accelerator may also include the RAM used to store the descriptors. In an example implementation, the RAM is implemented using programmable circuitry of the programmable IC.

In another aspect, the hardware accelerator includes an embedded processor and a network interface. The embedded processor may be configured to store further descriptors received from a network via the network interface in the RAM. The embedded processor also may be configured to write addresses of the further descriptors within the FIFO of the adapter.

FIG. 6 illustrates an example computing environment 600 for hardware acceleration. Computing environment 600 includes a host computer 602 coupled to a hardware acceleration device 604.

The components of host computer 602 may include, but are not limited to, a host CPU 606, a memory 608, and a bus 610 that couples various system components including memory 608 to host CPU 606. Host CPU 606 may be implemented as any of a variety of processors capable of executing program code. Example processor types include, but are not limited to, processors having an x86 type of architecture (Intel Architecture 32-bit, Intel Architecture 64-bit, etc.), Power Architecture, ARM processors, and the like. Further, while host computer 602 is shown as including a single host CPU 606, in other examples, multiple host CPUs may be included.

Bus 610 represents one or more of any of several types of communication buses. Examples of communication buses include, but are not limited to, Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Host computer 602 typically includes a variety of computer readable media. Such media may be any available media that is accessible by host computer 602 and may include any combination of volatile media, non-volatile media, removable media, and/or non-removable media.

Memory 608 may include computer readable media in the form of volatile memory, such as RAM 612 and/or cache memory 614. Host computer 602 may also include other removable/non-removable, volatile/non-volatile computer system storage media. By way of example, storage system 616 may be provided for reading from and writing to a non-removable, non-volatile magnetic and/or solid-state media included therein (e.g., a "hard drive"). Although not shown, one or more disk drives for reading from and writing to a removable, non-volatile, magnetic and/or optical and/or solid-state media can be provided. In such instances, each may be connected to bus 610 by one or more data media interfaces. Memory 608 is an example of at least one computer program product having a set (e.g., one or more) of program modules (e.g., program code) configured to carry out the functions and/or operations described within this disclosure.

For example, program/utility 618 includes a set (e.g., one or more) of program modules 620. Program modules 620, being stored in memory 608, may include, but are not limited to, an operating system, one or more application programs (e.g., user applications), other program modules, and/or program data. Program modules 620 generally carry out the functions and/or methodologies as described herein at least with respect to operations performed by host computer 602. For example, program modules 620 may include user applications and/or a software stack. The software stack may implement a runtime environment capable of performing the host computer 602 operations described herein with regard to hardware acceleration device 604. In one aspect, program modules 620 includes a driver or daemon capable of communicating with IC 632.

Program/utility 618 is executable by host CPU 606. Program/utility 618 and any data items used, generated, and/or operated upon by host CPU 606 are functional data structures that impart functionality when employed by host CPU 606. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host computer 602 may include one or more Input/Output (I/O) interfaces 628 communicatively linked to bus 610. I/O interface(s) 628 allow host computer 602 to communicate with external devices, couple to external devices that allow user(s) to interact with host computer 602, couple to external devices that allow host computer 602 to communicate with other computing devices, and the like. For example, host computer 602 may be communicatively linked to a display 630 and to hardware acceleration device 604 through I/O interface(s) 628. Host computer 602 may be coupled to other external devices such as a keyboard (not shown) via I/O interface(s) 628. Examples of I/O interfaces 628 may include, but are not limited to, network cards, modems, network adapters, hardware controllers, etc.

In an example implementation, the I/O interface 628 through which host computer 602 communicates with hardware acceleration device 604 is a PCIe adapter. Hardware acceleration device 604 may be implemented as a circuit board, e.g., a card, that couples to host computer 602. Hardware acceleration device 604 may, for example, be inserted into an available card slot, e.g., an available bus and/or PCIe slot, of host computer 602.

Hardware acceleration device 604 includes an IC (e.g., hardware accelerator) 632. In one aspect, IC 632 is a programmable IC. Hardware acceleration device 604 also includes volatile memory 634 coupled to IC 632 and a non-volatile memory 636 also coupled to IC 632. Volatile memory 634 may be implemented as a RAM that is external to IC 632. Volatile memory 634 is considered a "local memory" of programmable IC 632, whereas memory 608, being within host computer 602, is not considered local to programmable IC 632. Non-volatile memory 636 may be implemented as flash memory. Non-volatile memory 636 is also external to IC 632 and may be considered local to IC 632.

In an example implementation, RAM 106 of FIG. 1 or 3 may be implemented as volatile memory 634. In another example implementation, RAM 106 of FIG. 1 or 3 may be implemented within IC 132 as a hardwired circuit block or in programmable circuitry.

In an example implementation, IC 632 includes programmable circuitry (e.g., programmable logic). For example, IC 632 may be implemented as an FPGA or another type of IC that includes at least some amount of programmable circuitry. It should be appreciated that, while not explicitly shown, IC 632 may include one or more hardwired circuit blocks that may be used in cooperation with the programmable circuitry.

In one or more example implementations, IC 632 is connected to a network 638. Network 638 may be implemented as an Ethernet type of network. Network 638 may operate at any of a variety of different speeds. For example, network 638 may be a 10G, 25G, 50G, 100G, 200G, 400G, or other speed network. In particular implementations, network 638 may be, include, or couple to a 5G network. Accordingly, IC 632 may include an Ethernet interface such as network interface 304 of FIG. 3 (not shown in the example of FIG. 6) that is used to connect to, e.g., communicatively link, IC 632 to network 638. For example, IC 632 may be connected via network 638 to an Ethernet switch or one or more other network connected devices. For purposes of illustration, the term "network" refers to network 638 herein, e.g., an Ethernet network.

FIG. 6 is not intended to suggest any limitation as to the scope of use or functionality of the examples described herein. Host computer 602 is an example of computer hardware (e.g., a system) that is capable of performing the various operations described within this disclosure attributed to the host computer and/or host CPU.

Host computer 602 is only one example implementation of a computer that may be used with hardware acceleration device 604. Host computer 602 is shown in the form of a computing device, e.g., a computer or server. In one aspect, host computer 602 can be practiced within a datacenter. For example, host computer 602 may be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments, edge computing environments, and/or datacenters, generally support the FPGA-as-a-Service (FaaS) model. In the FaaS model, user functions and/or network functions are hardware accelerated as circuit designs implemented within programmable ICs operating under control of the host computer. Other examples of cloud computing models are described in the National Institute of Standards and Technology (NIST) and, more particularly, the Information Technology Laboratory of NIST.

Host computer 602 is operational with numerous other general-purpose or special-purpose computing system environments or configurations. Examples of computing systems, environments, and/or configurations that may be suitable for use with host computer 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

FIG. 7 illustrates an example architecture 700 for an IC that may be used for hardware acceleration. Architecture 700 may be used to implement a hardware accelerator as described in connection with FIGS. 1 and/or 3. For example, in the example of FIG. 1, architecture 100 may be used to implement switch 104, adapter 108, compute unit 110, and optionally RAM 106. In the example of FIG. 3, architecture 100 may be used to implement switch 104, adapter 108, compute unit 110, optionally RAM 106, embedded processor 302, and network interface 304.

In one aspect, architecture 700 may be used to implement a hardware accelerator that includes the host CPU embedded therein. In another aspect, architecture 700 may be used to implement a hardware accelerator as described in connection with FIG. 6, where the host CPU is included in a host computer.

Architecture 700 may be implemented within a programmable IC. For example, architecture 700 may be used to implement an FPGA. Architecture 700 may also be representative of a System-on-Chip (SoC) type of IC. An SoC is an IC that includes a processor that executes program code and one or more other circuits. The other circuits may be implemented as hardwired circuitry, programmable circuitry and/or logic, and/or a combination thereof. The circuits may operate cooperatively with one another and/or with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. INTs 711, taken together, implement the programmable interconnect structure for the illustrated IC. Each INT 711 also includes the connections to and from the programmable logic element within the same tile, as shown by the examples included at the right of FIG. 7.

For example, a CLB 702 may include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An IOB 704 may include, for example, two instances of an I/O logic element (IOL) 715 in addition to one instance of an INT 711. The actual I/O pads connected to IOL 715 may not be confined to the area of IOL 715.

In the example pictured in FIG. 7, a horizontal area near the center of the die, e.g., formed of regions 705, 707, and 708, may be used for configuration, clock, and other control logic. Vertical areas 709 extending from this horizontal area may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft-processor" in that the various blocks of programmable circuitry may be used to form a processor that can execute program code as is the case with PROC 710.

In an example implementation, PROC 710 may be used to implement the host CPU. Accordingly, in cases where the IC further includes the embedded processor, the embedded processor may be implemented as a soft-processor. In another example, where the host CPU is included in a host computer, PROC 710 may implement the embedded processor. In cases where architecture 700 does not include a hardwired processor, the embedded processor, if included, may be implemented as a soft-processor.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 7 that are external to PROC 710 such as CLBs 702 and BRAMs 703 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

In one or more example implementations, circuits such as switch 104, RAM 106, adapter 108, compute unit 110, and/or network interface 304 may be implemented using programmable circuitry of the IC. For example, RAM 106 may be implemented using one or more of BRAMs 703 or other RAM circuit blocks included in programmable circuitry. In another example implementation, one or more of the circuits noted such as switch 104 and/or network interface 304 may be implemented as hardwired circuitry.

In another example implementation, architecture 700 may be used to implement a die of a multi-die IC, where another die within the same package implements an HBM. The HBM may operate as RAM 106.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 710 or a soft-processor. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 7 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations.

FIG. 8 illustrates another example architecture 800 for an IC for hardware acceleration. Architecture 800 may be used to implement a hardware accelerator and represents an SoC type of IC. In the example, architecture 800 includes a processor system (PS) 802. While described as a "system," PS 802 is an example of a subsystem of architecture 800. In general, PS 802 is implemented as hardwired circuitry that is fabricated as part of architecture 800. PS 802 may be implemented as, or include, any of a variety of different processor types each capable of executing program code. The processors may have different architectures and/or instruction sets.

In the example, PS 802 includes various processors such as a real-time processing unit (RPU) 806, an application processing unit (APU) 808, a graphics processing unit (GPU) 810, a configuration and security unit (CSU) 812, and the like. Each of the processors is capable of executing program code.

PS 802 also includes various support circuits, such as on-chip memory (OCM) 814, transceivers 816, peripherals 818, interconnect 820, DMA circuit 822, memory controller 824, peripherals 826, and multiplexed input/output (MIO) circuit 828. The processors and the support circuits are interconnected by interconnect 820.

Transceivers 816 may be coupled to external pins 830. Programmable logic (PL) 850, to be described in greater detail below, may be coupled to external pins 832. Memory controller 820 may be coupled to external pins 834. MIO 828 may be coupled to external pins 836. PS 802 may be coupled to external pins 838. APU 808 can include a CPU 840, memory 842, and support circuits 844.

In the example of FIG. 8, each of processors 806, 808, and 810 may include one or more central processing units (CPUs) and associated circuits, such as memories, interrupt controllers, direct memory access (DMA) controllers, memory management units (MMUs), floating point units (FPUs), and the like. Interconnect 820 includes various switches, busses, communication links, and the like configured to interconnect processors 806, 808, 810 and to interconnect the other components in PS 802 to processors 806, 808, and 810.

In an example implementation, CPU 840 or another processor in APU 808 may be used to implement the host CPU. Accordingly, in cases where the IC further includes the embedded processor, the embedded processor may be implemented as a soft-processor, as RPU 806, or as another hardwired processor that may be included in APU 808. In another example, where the host CPU is included in a host computer, the embedded processor may be implemented as CPU 840, another hardwired processor in APU 808, as RPU 806, or as a soft-processor.

OCM 814 includes one or more RAM modules, which can be distributed throughout PS 802. For example, OCM 814 can include battery backed RAM (BBRAM), tightly coupled memory (TCM), and the like. Memory controller 824 can include a dynamic DRAM interface for accessing external DRAM. Peripherals 818, 826 can include one or more components that provide an interface to PS 806. For example, peripherals 822 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose IO (GPIO) ports, serial advanced technology attachment (SATA) ports, PCIe ports, and the like. Peripherals 826 can be coupled to MIO 828. Peripherals 818 can be coupled to transceivers 816. Transceivers 816 can include serializer/deserializer (SERDES) circuits, MGTs, and the like.

In the example of FIG. 8, device 800 optionally includes programmable logic 850 subsystem. Programmable logic 850 is circuitry that may be programmed to perform specified functions. As an example, programmable logic 850 may be implemented as field programmable gate array type of circuitry. Programmable logic 850 can include an array of programmable circuit blocks.

In the example of FIG. 8, programmable logic 850 may be coupled to interconnect 820. In one aspect, programmable logic 850 may couple to PS 802 via an AXI interconnect. As such, any compute units implemented in programmable logic 850 may be accessed by PS 802 via interconnect 820, which may be implemented as an AXI interconnect. As discussed in connection with FIG. 7, the topology of programmable logic 850 is highly configurable unlike hardwired circuitry.

Device 800 may include one or more other subsystems including a processor array (e.g., a data processing engine (DPE) array), a Network-on-Chip (NoC), a platform management controller (PMC), and one or more hardwired circuit blocks. A hardwired circuit block refers to a special-purpose circuit block fabricated as part of architecture 800.

Though hardwired, hardwired circuit blocks may be configured by loading configuration data into control registers to implement one or more different modes of operation therein. Examples of hardwired circuit blocks may include input/output (I/O) blocks, transceivers for sending and receiving signals to circuits and/or systems external to architecture 800, memory controllers, or the like. Examples of different I/O blocks may include single-ended and pseudo differential I/Os. Examples of transceivers may include high-speed differentially clocked transceivers. Other examples of hardwired circuit blocks include, but are not limited to, cryptographic engines, digital-to-analog converters (DACs), analog-to-digital converters (ADCs), and the like. In general, hardwired circuit blocks are application-specific circuit blocks.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a Local Area Network (LAN), a Wide Area Network (WAN), and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A hardware acceleration device, comprising:
a switch communicatively linked to a host central processing unit (CPU);
an adapter circuit coupled to the switch via a control bus, wherein the control bus is configured to convey addresses of descriptors from the host CPU to the adapter circuit, and wherein the host CPU initiates register writes to write the addresses of the descriptors over the control bus to registers within the adapter circuit;
a random-access memory coupled to the switch through a data bus, wherein the random-access memory is configured to store descriptors received from the host CPU via the data bus;
a compute circuit coupled to the adapter circuit and configured to perform operations specified by the descriptors; and
wherein the adapter circuit is configured to retrieve the descriptors from the random-access memory via the data bus using the addresses received over the control bus, provide arguments from the descriptors to the compute circuit, and provide control signals to the compute circuit to initiate the operations using the arguments.

2. The hardware acceleration device of claim 1, wherein: the data bus is a memory-mapped bus.

3. The hardware acceleration device of claim 1, wherein: the switch is a Peripheral Component Interconnect Express (PCIe) switch; and
the control bus and the data bus are implemented as on-chip interconnects.

4. The hardware acceleration device of claim 1, wherein: the switch includes a first Base Address Register coupled to the control bus and a second Base Address Register coupled to the data bus.

5. The hardware acceleration device of claim 1, wherein the adapter circuit comprises:
a first-in-first-out memory configured to store the addresses.

6. The hardware acceleration device of claim 5, wherein the adapter circuit comprises:
a counter configured to store a number of operations that have completed processing by the compute circuit.

7. The hardware acceleration device of claim 1, comprising:
a programmable integrated circuit including the switch, the adapter circuit, and the compute circuit.

8. The hardware acceleration device of claim 7, wherein: the programmable integrated circuit includes the random-access memory.

9. The hardware acceleration device of claim 7, wherein: the random-access memory is implemented external to the programmable integrated circuit and disposed on a circuit board with the programmable integrated circuit.

10. The hardware acceleration device of claim 7, wherein the programmable integrated circuit comprises:
an embedded processor;
a network interface; and
wherein the embedded processor is configured to store further descriptors, received from a network via the network interface, in the random-access memory and provide addresses of the further descriptors to the adapter circuit.

11. The hardware acceleration device of claim 7, wherein: the programmable integrated circuit includes the host CPU embedded therein; and
the switch includes a first port coupled to the control bus and a second port coupled to the data bus.

12. The hardware acceleration device of claim 1, wherein the random-access memory is implemented as a high-bandwidth memory.

13. A method of hardware acceleration, comprising:
receiving a plurality of descriptors and a plurality of addresses for the plurality of descriptors via a switch of a hardware acceleration device, wherein the switch is communicatively linked to a host central processing unit (CPU);
wherein the descriptors specify operations to be performed by a compute circuit of the hardware acceleration device;
conveying the plurality of descriptors to a random-access memory for storage therein via a data bus;
conveying the plurality of addresses to an adapter circuit via a control bus;
wherein the host CPU initiates register writes to write the plurality of addresses of the descriptors over the control bus to registers within the adapter circuit; and
using the adapter circuit, retrieving the plurality of descriptors from the random-access memory via the data bus using the plurality of addresses received over the control bus, providing arguments from the descriptors to the compute circuit, and providing control signals to the compute circuit to initiate the operations using the arguments.

14. The method of claim 13, wherein:
the switch is a Peripheral Component Interconnect Express (PCIe) switch.

15. The method of claim 13, wherein:
the switch includes a first Base Address Register coupled to the control bus and a second Base Address Register coupled to the data bus.

16. The method of claim 13, wherein the adapter circuit comprises:
a first-in-first-out memory configured to store the addresses.

17. The method of claim 13, wherein:
the hardware acceleration device includes a programmable integrated circuit; and
the programmable integrated circuit includes the switch, the adapter circuit, and the compute circuit.

18. The method of claim 17, wherein:
the programmable integrated circuit includes the random-access memory.

19. The method of claim 17, wherein the programmable integrated circuit comprises:
an embedded processor;
a network interface; and
wherein the embedded processor is configured to store further descriptors, received from a network via the network interface, in the random-access memory and provide addresses of the further descriptors to the adapter circuit.

20. The method of claim 17, wherein:
the programmable integrated circuit includes the host CPU embedded therein; and
the switch includes a first port coupled to the control bus and a second port coupled to the data bus.

* * * * *